US009533578B2

(12) United States Patent
Takashima et al.

(10) Patent No.: US 9,533,578 B2
(45) Date of Patent: Jan. 3, 2017

(54) ELECTRONIC CONTROL UNIT

(71) Applicants: KEIHIN CORPORATION, Tokyo (JP); HONDA MOTOR CO., LTD., Tokyo (JP)

(72) Inventors: Yuzuru Takashima, Tochigi (JP); Masaki Tanno, Tochigi (JP); Takeshi Yamada, Tochigi (JP); Haruki Umeya, Saitama (JP); Shinichi Daibo, Saitama (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 338 days.

(21) Appl. No.: 13/654,938

(22) Filed: Oct. 18, 2012

(65) Prior Publication Data

US 2013/0099742 A1  Apr. 25, 2013

(30) Foreign Application Priority Data

Oct. 21, 2011  (JP) .................................. 2011-231807

(51) Int. Cl.
*H02J 7/00* (2006.01)
*B60L 3/04* (2006.01)
(Continued)

(52) U.S. Cl.
CPC ............... *B60L 3/04* (2013.01); *B60L 3/0069* (2013.01); *B60L 11/1816* (2013.01); *B60L 11/1846* (2013.01); *H02J 7/0031* (2013.01); *B60L 2210/30* (2013.01); *B60L 2240/547* (2013.01); *B60L 2240/549* (2013.01); *Y02T 10/7005* (2013.01); *Y02T 10/7088* (2013.01);
(Continued)

(58) Field of Classification Search
CPC ....... H02J 7/0031; B60L 3/04; B60L 11/1816; B60L 3/0069
USPC ......... 320/104, 109; 180/65.1, 65.21, 65.29; 701/22; 903/903, 907
See application file for complete search history.

(56) References Cited

U.S. PATENT DOCUMENTS 7,688,024 B2 * 3/2010 Kamaga ...................... 320/104
8,198,855 B2   6/2012 Fukui et al.
(Continued)

FOREIGN PATENT DOCUMENTS

CN    101825688 A    9/2010
CN    102216961 A    10/2011
(Continued)

OTHER PUBLICATIONS

United States Non Final Office Action for corresponding to U.S. Appl. No. 13/648,572; Notification Date: Nov. 17, 2014.
(Continued)

*Primary Examiner* — Richard V Muralidar
(74) *Attorney, Agent, or Firm* — Cantor Colburn LLP

(57) ABSTRACT

An electronic control unit includes a processor performing a process necessary for a charging control based on a pilot signal, an input circuit disposed in a stage preceding an input port of the processor, and a pseudo-signal supply circuit supplying a pseudo-pilot signal to a pilot signal line under the control of the processor, and the processor performs a malfunction diagnosis for the input circuit based on a signal state of the input port when controlling the pseudo-signal supply circuit to supply the pseudo-pilot signal to the pilot signal line.

2 Claims, 4 Drawing Sheets

(51) Int. Cl.
*B60L 3/00* (2006.01)
*B60L 11/18* (2006.01)

(52) U.S. Cl.
CPC .......... *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 8,258,744 | B2 | 9/2012 | Ishii et al. |
| 8,368,350 | B2 * | 2/2013 | Iwanaga ................ B60K 6/365 320/109 |
| 8,487,636 | B2 * | 7/2013 | Mitsutani et al. ............ 324/538 |
| 8,541,978 | B2 * | 9/2013 | Fukuo et al. ................. 320/109 |
| 8,618,767 | B2 | 12/2013 | Ishii et al. |
| 8,768,563 | B2 * | 7/2014 | Nitzberg et al. ............. 701/31.6 |
| 8,774,997 | B2 | 7/2014 | Ichikawa et al. |
| 8,917,054 | B2 * | 12/2014 | Acena ................. B60L 11/1816 320/104 |
| 9,112,373 | B2 * | 8/2015 | Ghabbour |
| 2010/0007306 | A1 | 1/2010 | Fukui et al. |
| 2010/0079105 | A1 | 4/2010 | Iwanaga et al. |
| 2010/0213896 | A1 | 8/2010 | Ishii et al. |
| 2010/0268406 | A1 | 10/2010 | Ito et al. |
| 2010/0295507 | A1 | 11/2010 | Ishii et al. |
| 2011/0121779 | A1 | 5/2011 | Ichikawa et al. |
| 2012/0133325 | A1 * | 5/2012 | Thomas et al. ............... 320/109 |
| 2012/0249066 | A1 | 10/2012 | Ichikawa |
| 2013/0099740 | A1 | 4/2013 | Takashima et al. |
| 2013/0162208 | A1 | 6/2013 | Ohnuki |
| 2014/0002011 | A1 | 1/2014 | Ang et al. |
| 2014/0002024 | A1 | 1/2014 | Ang et al. |
| 2014/0167691 | A1 | 6/2014 | Kamaga |
| 2014/0217813 | A1 | 8/2014 | Kinomura et al. |

FOREIGN PATENT DOCUMENTS

| | | |
|---|---|---|
| JP | 2000049592 A | 2/2000 |
| JP | 2001339267 A | 12/2001 |
| JP | 2008076339 A | 4/2008 |
| JP | 2009-071989 A | 4/2009 |
| JP | 2009150779 A | 7/2009 |
| JP | 2010022163 A | 1/2010 |
| JP | 2010081740 A | 4/2010 |
| JP | 2011069694 A | 4/2011 |
| JP | 201169694 * | 7/2011 |
| JP | 2011172327 A | 9/2011 |
| WO | 9534824 A1 | 12/1995 |

OTHER PUBLICATIONS

Notice of Reasons for Rejection corresponding to Japanese Application No. 2011-231805; Mailing Date: May 26, 2015, with English translation.

Japanese Notice of Reasons for Rejection corresponding to Application No. 2011-231807; Date of Mailing: Jul. 7, 2015, with English translation.

Chinese First Office Action corresponding to Application No. 201210390544.4; Date of Mailing: Sep. 14, 2015, with English translation.

Chinese First Office Action corresponding to Application No. 201210395685.5; Date of Mailing: Oct. 10, 2015, with English translation of Search Report.

* cited by examiner

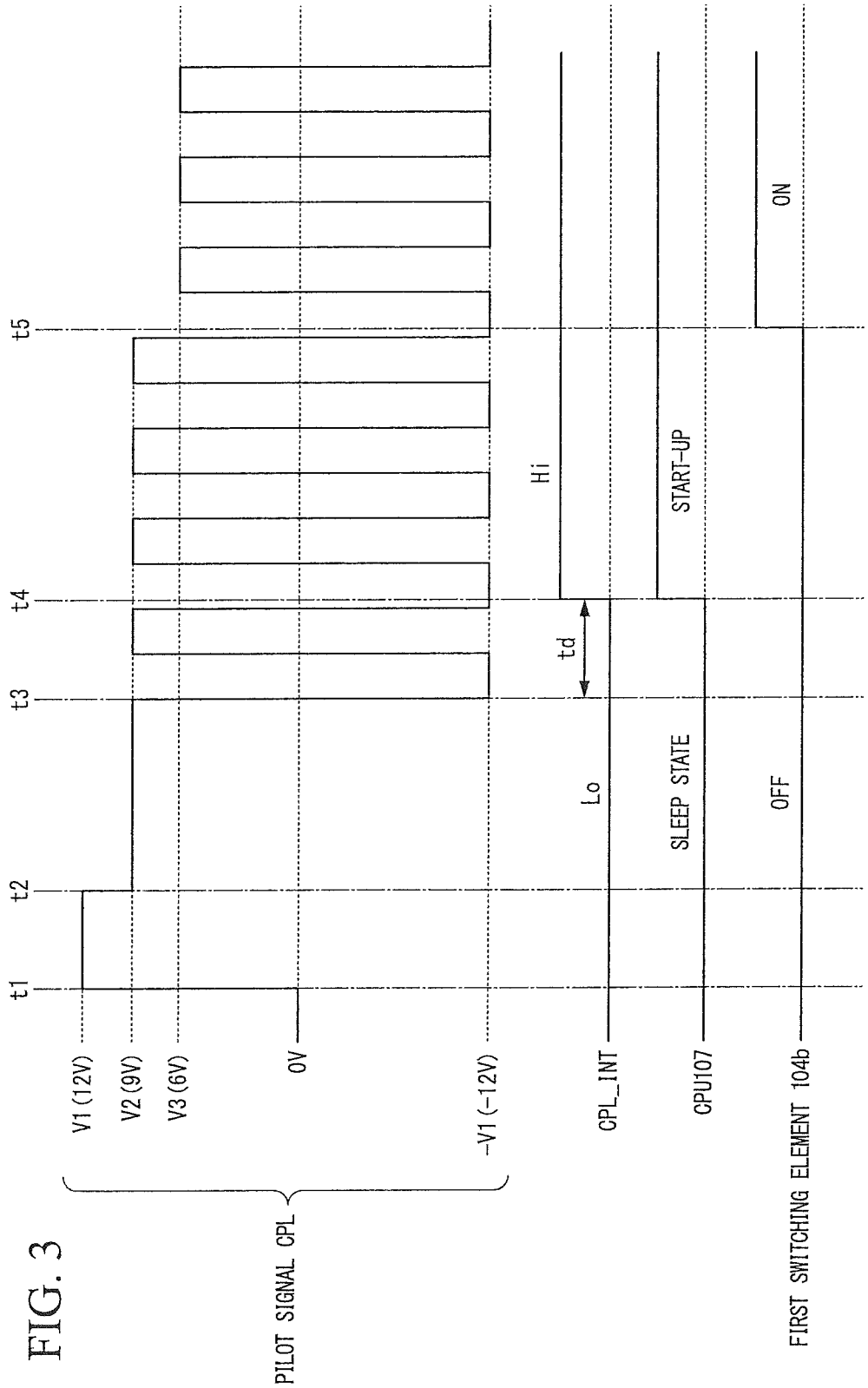

ELECTRONIC CONTROL UNIT

The present invention relates to an electronic control unit.

Priority is claimed on Japanese Patent Application No. 2011-231807, filed on Oct. 21, 2011, the content of which is incorporated herein by reference.

BACKGROUND OF THE INVENTION

Field of the Invention

In recent years, vehicles (hereinafter, collectively referred to as plug-in vehicles) such as electric cars or plug-in hybrid cars that can be charged by the use of an external power supply have been increasingly put to practical use. A dedicated charging cable having a control unit called a CCID (Charge Circuit Interrupt Device) is used to connect a plug-in vehicle to an external power supply.

The standard on an interface between the charging cable and the plug-in vehicle is defined by the "SAE (Electric Vehicle Conductive Charge Coupler) standard" of the U.S. or the "General Requirements for Electric Vehicle Conductive Charging System (the Japanese Electric Vehicle Standard)" of Japan. The charging sequence of a plug-in vehicle defined in the standard is substantially as follows.

First, a CCID of a charging cable transmits a control pilot signal (hereinafter, abbreviated as a pilot signal) to a charging-control ECU (Electronic Control Unit) mounted on a plug-in vehicle and determines that the charging cable is connected to the plug-in vehicle when the voltage of the pilot signal is changed from an initial value V1 (for example, 12 V) to V2 (for example, 9 V).

Then, the CCID of the charging cable informs the ECU of the plug-in vehicle of the rated current of a power supply facility by transmitting a pilot signal with a duty ratio corresponding to the rated current of the power supply facility (including an external power supply and a charging cable).

Subsequently, the ECU of the plug-in vehicle informs the CCID of the charging cable of completion of the preparation for charging by changing the voltage of the pilot signal from V2 to V3 (for example, 6 V).

Then, when detecting that the voltage of the pilot signal has changed from V2 to V3, the CCID of the charging cable determines that the preparation for charging of the plug-in vehicle side is completed, and turns on a relay used to supply the power of the external power supply to the plug-in vehicle (that is, starts the supply of power).

In this way, the pilot signal is a signal essential for controlling the charging of the plug-in vehicle and it is very important to detect abnormality of the pilot signal. For example, Japanese Unexamined Patent Application, First Publication No. 2009-71989 discloses a technique of detecting a disconnection of a control line used for transmission of a pilot signal in a state where a plug-in vehicle is connected to an external power supply via a charging cable.

Description of the Related Art

As described in Japanese Unexamined Patent Application, First Publication No. 2009-71989, the pilot signal is input to a processor such as a CPU via an input circuit (such as an input buffer) in an ECU of the plug-in vehicle. When the input circuit is out of order, the processor of the ECU is not started up or an appropriate charging control is not performed. Accordingly, a circuit for diagnosing the malfunction of the input circuit is necessary, but such a circuit is not disclosed in Japanese Unexamined Patent Application, First Publication No. 2009-71989.

The invention is made in consideration of the above-mentioned circumstances and an object thereof is to provide an electronic control unit that can diagnose a malfunction of an input circuit disposed in a stage preceding a processor performing a process necessary for a charging control based on a pilot signal.

SUMMARY OF THE INVENTION

The present invention employs the following configurations to solve the above problems.

(1) According to an aspect of the invention, there is provided an electronic control unit that is mounted on a vehicle which is configured to be charged with an external power supply and that receives a pilot signal via a charging cable before being supplied with a power when the vehicle is connected to the external power supply via the charging cable, the electronic control unit including: a processor that performs a process necessary for a charging control based on the pilot signal; an input circuit that is disposed in a stage preceding an input port of the processor; and a pseudo-signal supply circuit that supplies a pseudo-pilot signal to a pilot signal line extending from a pilot signal input terminal of the electronic control unit to the input circuit under control of the processor, wherein the processor performs a malfunction diagnosis for the input circuit based on a signal state of the input port when controlling the pseudo-signal supply circuit to supply the pseudo-pilot signal to the pilot signal line.

(2) In the electronic control unit described in (1) above, the input port may include an interrupt port used to input a start-up factor interrupt signal serving as a start-up factor of the processor, the input circuit may include a circuit that generates the start-up factor interrupt signal and outputs the generated start-up factor interrupt signal to the interrupt port when a pulse-like pilot signal is input via the pilot signal line, and the processor may perform the malfunction diagnosis for the input circuit based on the signal state of the interrupt port when controlling the pseudo-signal supply circuit to supply a pulse-like pseudo-pilot signal to the pilot signal line.

(3) In the electronic control unit described in (1) above, the input port may include an interrupt port used to input a start-up factor interrupt signal serving as a start-up factor of the processor and a duty measurement port used to measure a duty ratio of the pilot signal, the input circuit may include a circuit that generates the start-up factor interrupt signal and outputs the generated start-up factor interrupt signal to the interrupt port when a pulse-like pilot signal is input via the pilot signal line and that buffers the pilot signal and outputs the buffered pilot signal to the duty measurement port, and the processor may perform the malfunction diagnosis for the input circuit based on the signal states of the interrupt port and the duty measurement port when controlling the pseudo-signal supply circuit to supply a pulse-like pseudo-pilot signal to the pilot signal line.

(4) In the electronic control unit described in any one of (1) to (3) above, the processor may perform the malfunction diagnosis for the input circuit when the charging cable is not connected to the vehicle.

BRIEF DESCRIPTION OF THE DRAWINGS

FIG. 3 is a timing diagram illustrating a charging operation of the vehicle charging system.

DETAILED DESCRIPTION OF THE INVENTION

Hereinafter, an embodiment of the invention will be described in detail with reference to the accompanying drawings.

Figure 1:
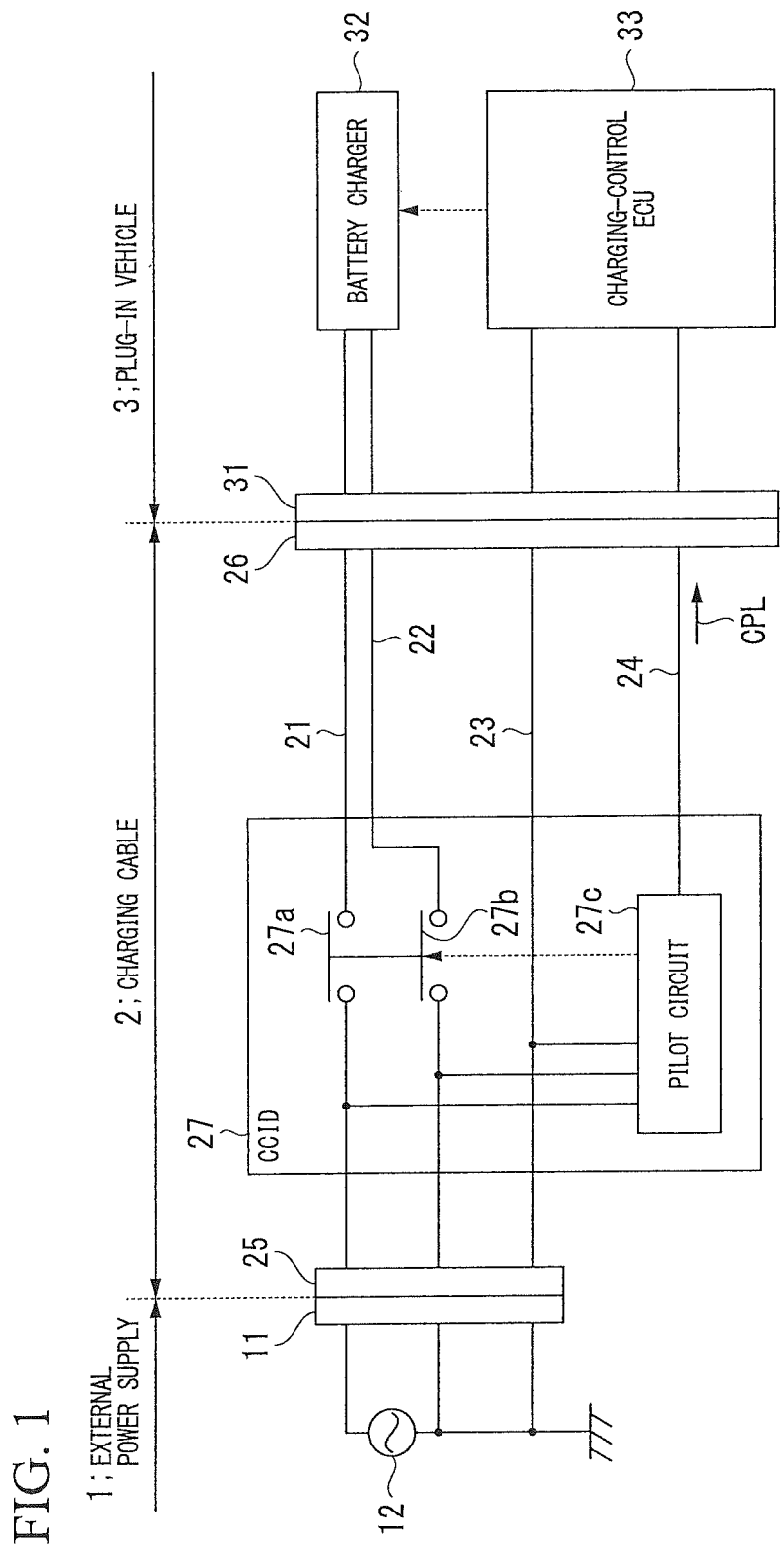
FIG. 1 is a diagram schematically illustrating the configuration of a vehicle charging system according to an embodiment of the invention.

FIG. 1 is a schematic diagram illustrating the configuration of a vehicle charging system according to an embodiment of the invention. As shown in FIG. 1, the vehicle charging system according to this embodiment includes an external power supply 1, a charging cable 2, and a plug-in vehicle 3. The external power supply 1 includes a power receptacle 11 with a ground terminal disposed, for example, in a house and an AC power supply (commercial power supply) 12 supplying single-phase AC power to the power receptacle 11.

The charging cable 2 includes two power supply lines 21 and 22, a ground line 23, a pilot line 24, a plug 25, and a cable-side coupler 26, and a CCID 27. In each of the power supply lines 21 and 22 and the ground line 23, an end thereof is connected to the plug 25 and the other end thereof is connected to the cable-side coupler 26. An end of the pilot line 24 is connected to the CCID 27 (specifically, a pilot circuit 27c) and the other end thereof is connected to the cable-side coupler 26.

By connecting the plug 25 to the power receptacle 11, one end of each of the power supply lines 21 and 22 is connected to the AC power supply 12 and one end of the ground line 23 is connected to the ground of the external power supply 1. By connecting the cable-side coupler 26 to a vehicle-side coupler 31 of the plug-in vehicle 3, the other end of each of the power supply lines 21 and 22 is connected to a battery charger 32 of the plug-in vehicle 3 and the other end of each of the ground line 23 and the pilot line 24 is connected to a charging-control ECU 33 of the plug-in vehicle 3.

The CCID 27 is a control unit that is disposed in the middle of the power supply lines 21 and 22 and the ground line 23, and includes relays 27a and 27b disposed in the middle of the power supply lines 21 and 22 and a pilot circuit 27c transmitting a pilot signal CPL to the charging-control ECU 33 of the plug-in vehicle 3 via the pilot line 24 and controlling ON and OFF states of the relays 27a and 27b. The pilot circuit 27c is connected to the power supply lines 21 and 22 and the ground line 23 and is supplied with a source voltage from the power supply lines 21 and 22 and with a ground voltage from the ground line 23.

The plug-in vehicle 3 is a vehicle which can be charged with the external power supply 1, such as an electric car or a plug-in hybrid car, and includes a vehicle-side coupler 31, a battery charger 32, and a charging-control ECU 33. By connecting the cable-side coupler 26 of the charging cable 2 to the vehicle-side coupler 31, the power supply lines 21 and 22 are connected to the battery charger 32, and the ground line 23 and the pilot line 24 are connected to the charging-control ECU 33.

The battery charger 32 is a charging circuit that converts single-phase AC power supplied from the external power supply 1 via the charging cable 2 (the power supply lines 21 and 22) into DC power under the control of the charging-control ECU 33 and that charges a driving battery (not shown) mounted on the plug-in vehicle 3 with the DC power. The charging-control ECU 33 is an electronic control unit that receives a pilot signal CPL via the charging cable 2 before being supplied with the power when the plug-in vehicle 3 is connected to the external power supply 1 via the charging cable 2 and that performs a process necessary for the charging control of the driving battery based on the pilot signal CPL.

Figure 2:
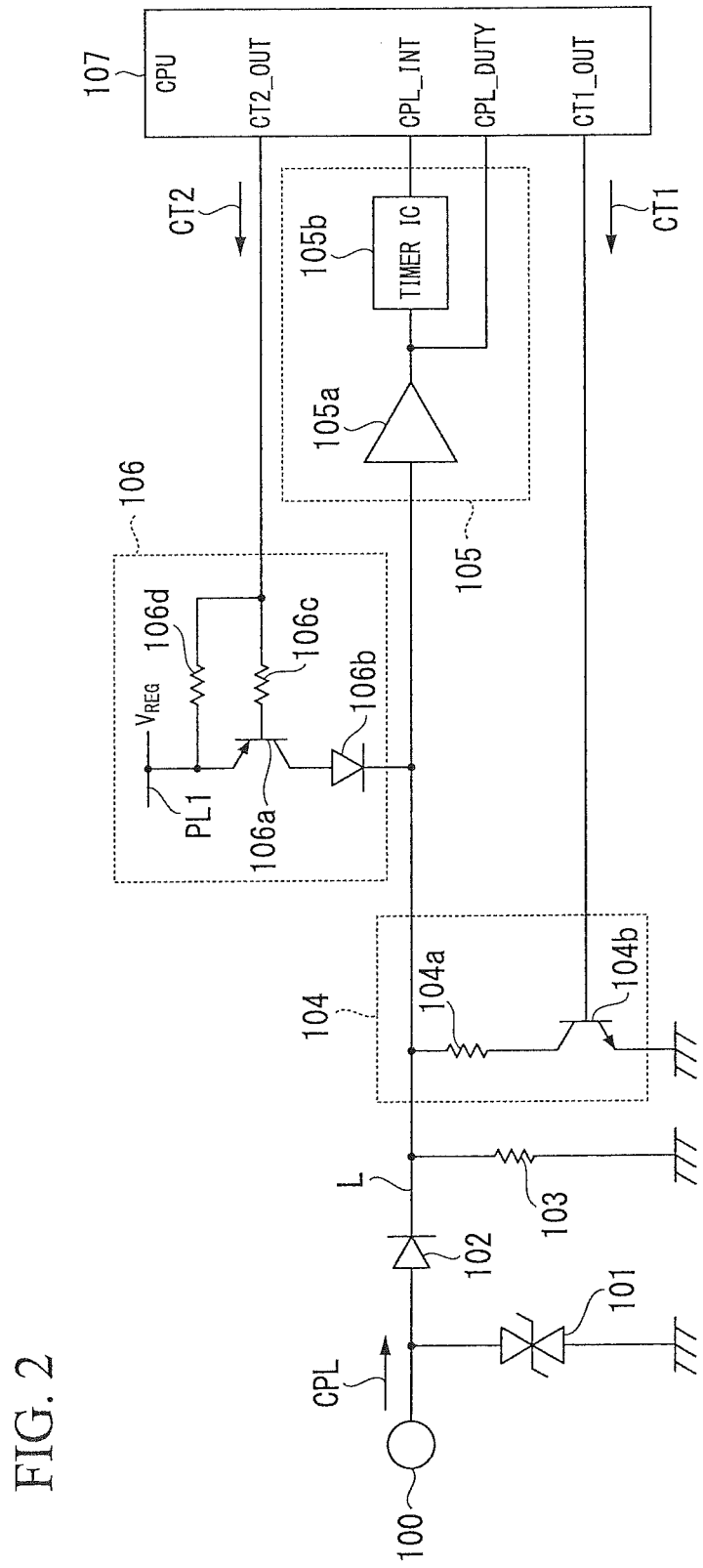
FIG. 2 is a diagram illustrating the internal configuration of a charging-control ECU 33 mounted on a plug-in vehicle 3.

FIG. 2 is a diagram illustrating the internal configuration of the charging-control ECU 33. As shown in FIG. 2, the charging-control ECU 33 includes a pilot signal input terminal 100, an avalanche diode 101, a first diode 102, a first pull-down resistor 103, a pilot voltage setting circuit 104, an input circuit 105, a pseudo-signal supply circuit 106, and a CPU 107.

The pilot signal input terminal 100 is an external input terminal that is connected to the pilot line 24 when the cable-side coupler 26 of the charging cable 2 is connected to the vehicle-side coupler 31. The avalanche diode 101 has one end connected to the pilot signal input terminal 100 and the other end connected to the ground and serves to maintain the voltage of the pilot signal CPL (the voltage between the pilot signal input terminal 100 and the ground) input via the pilot signal input terminal 100 at V1 (for example, 12 V) or lower.

The first diode 102 has an anode terminal connected to the pilot signal input terminal 100 and a cathode terminal connected to one end of the first pull-down resistor 103 and serves to pass only a positive signal of the pilot signal CPL. The first pull-down resistor 103 has one end connected to the cathode terminal of the first diode 102 and the other end connected to the ground and serves to change the positive voltage of the pilot signal CPL (that is, the voltage between the cathode terminal of the first diode 102 and the ground) from V1 to V2 (for example, 9 V).

The pilot voltage setting circuit 104 is a circuit that changes the positive voltage of the pilot signal CPL in a stepwise manner (for example, changes the voltage from V2 to V3 (for example, 6 V)) under the control of the CPU 107 and includes a second pull-down resistor 104a and a first switching element 104b which is, for example, an npn-type transistor.

In the pilot voltage setting circuit 104, one end of the second pull-down resistor 104a is connected to the cathode terminal of the first diode 102 and the other end thereof is connected to the collector terminal of the first switching element 104b. The collector terminal of the first switching element 104b is connected to the other end of the first pull-down resistor 104a, the emitter terminal thereof is connected to the ground, and the base terminal thereof is connected to a first control signal output port CT1_OUT of the CPU 107. The first switching element 104b is switched between ON and OFF states depending on a first control signal CT1 output from the first control signal output port CT1_OUT of the CPU 107 to the base terminal.

In the pilot voltage setting circuit 104 having this configuration, when the first switching element 104b is in ON state, the other end of the second pull-down resistor 104a is connected to the ground and the positive voltage of the pilot signal CPL is changed from V2 to V3.

The input circuit 105 is disposed in a stage preceding the input port of the CPU 107 and includes an input buffer 105a and a timer IC 105b. Here, the input port of the CPU 107 includes an interrupt port CPL_INT used to input a start-up factor interrupt signal serving as a start-up factor of the CPU 107 and a duty measurement port CPL_DUTY used to measure a duty ratio of the pilot signal CPL.

The input buffer 105a is, for example, a logic IC (NOT circuit), the input terminal thereof is connected to the cathode terminal of the second diode 102, and the output terminal thereof is connected to the input terminal of the timer IC 105b and the duty measurement port CPL_DUTY of the CPU 107. The timer IC 105b includes an input terminal connected to the output terminal of the input buffer 105a and an output terminal connected to the interrupt port CPL_INT of the CPU 107 and serves to generate the start-up factor interrupt signal and to output the generated start-up factor interrupt signal to the interrupt port CPL_INT when a pulse-like pilot signal CPL is input.

In this way, the input circuit 105 is a circuit that generates the start-up factor interrupt signal and outputs the generated start-up factor interrupt signal to the interrupt port CPL_INT of the CPU 107 and that buffers the pilot signal CPL and outputs the buffered pilot signal to the duty measurement port CPL_DUTY of the CPU 107, when a pulse-like pilot signal CPL is input.

The pseudo-signal supply circuit 106 is a circuit that supplies a pseudo-pilot signal to the pilot signal line L extending from the pilot signal input terminal 100 to the input circuit 105 under the control of the CPU 107 and includes a second switching element 106a which is, for example, a pnp-type transistor, a second diode 106b, and two resistors 106c and 106d.

The emitter terminal of the second switching element 106a is connected to a power supply line PL1, the collector terminal thereof is connected to the pilot signal line L via the second diode 106b, and the base terminal thereof is connected to a second control signal output port CT2_OUT of the CPU 107 via the resistor 106c. The second switching element 106a is switched between ON and OFF states depending on a second control signal CT2 output from the second control signal output port CT2_OUT of the CPU 107 to the base terminal thereof.

The charging-control ECU 33 includes a regulator that drops a main source voltage $V_{IGB}$ supplied from a low-voltage battery mounted on the plug-in vehicle 3 independently of a driving battery to generate a sub source voltage $V_{REG}$. The sub source voltage $V_{REG}$ output from the regulator is applied to the power supply line PL1.

The anode terminal of the second diode 106b is connected to the collector terminal of the second switching element 106a and the cathode terminal thereof is connected to the pilot signal line L. One end of the resistor 106c is connected to the base terminal of the second switching element 106a and the other end thereof is connected to the second control signal output port CT2_OUT of the CPU 107. One end of the resistor 106d is connected to the emitter terminal of the second switching element 106a and the other end thereof is connected to the other end of the resistor 106c.

In the pseudo-signal supply circuit 106 having this configuration, it is possible to supply a pulse signal of a desired frequency and a desired duty ratio as a pseudo-pilot signal to the pilot signal line L by controlling the second switching element 106a in a PWM manner. The maximum amplitude value of the pseudo-pilot signal is equal to the sub source voltage $V_{REG}$.

The CPU 107 is a processor that performs a process necessary for a charging control based on the pilot signal CPL (in other words, based on the signal states of the interrupt port CPL_INT and the duty measurement port CPL_DUTY) and that controls the pilot voltage setting circuit 104 to change the voltage of the pilot signal CPL in a stepwise manner.

Although the details will be described later, the CPU 107 has a function of performing a malfunction diagnosis for the input circuit 105 based on the signal states of the interrupt port CPL_INT and the duty measurement port CPL_DUTY when controlling the pseudo-signal supply circuit 106 to supply a pulse-like pseudo-pilot signal to the pilot signal line L as the malfunction diagnosis process for the input circuit 105.

The operation of the vehicle charging system having the above-mentioned configuration will be described below with reference to the timing diagram of FIG. 3.

First, at time t1 in FIG. 3, when the plug 25 of the charging cable 2 is connected to the power receptacle 11 of the external power supply 1, the pilot circuit 27c of the CCID 27 is supplied with power from the AC power supply 12 via the power supply lines 21 and 22, is started up, and outputs a pilot signal CPL of a voltage value V1 (12 V) via the pilot line 24. At this time point, the relays 27a and 27b of the CCID 27 are in OFF state and the CPU 107 of the charging-control ECU 33 is in a sleep state.

As shown in FIG. 3, when the CPU 107 is in the sleep state, the first control signal CT1 output from the CPU 107 is at a low level. Accordingly, the first switching element 104b of the pilot voltage setting circuit 104 is in OFF state. At this time point, since the pilot signal CPL is not input to the charging-control ECU 33, the start-up factor interrupt signal output from the timer IC 105b of the input circuit 105 is at a low level and the signal state of the interrupt port CPL_INT of the CPU 107 is also at a low level.

Subsequently, at time t2 in FIG. 3, when the cable-side coupler 26 of the charging cable 2 is connected to the vehicle-side coupler 31 of the plug-in vehicle 3, the pilot signal CPL is input to the pilot signal input terminal 100 of the charging-control ECU 33, but the positive voltage of the pilot signal CPL (the voltage between the cathode terminal of the first diode 102 and the ground) is changed from V1 to V2 (9 V) by the first pull-down resistor 103.

When the change in voltage of the pilot signal CPL (the change in voltage of the pilot line 24) is detected, the pilot circuit 27c of the CCID 27 determines that the charging cable 2 is connected to the plug-in vehicle 3 and informs the charging-control ECU 33 of the rated current of the power supply facility by transmitting the pilot signal CPL at a duty ratio corresponding to the rated current of the power supply facility (the external power supply 1 and the charging cable 2) at time t3 in FIG. 3.

In this way, after time t3, when the pulse-like pilot signal CPL having a duty ratio corresponding to the rated current is input to the charging-control ECU 33, the timer IC 105b of the input circuit 105 outputs a start-up factor interrupt signal of a high level to the interrupt port CPL_INT of the CPU 107 at time t4 in a fixed time td after detecting a first edge of the pulse-like pilot signal CPL. That is, at time t4, the signal state of the interrupt port CPL_INT is changed to a high level.

When the CPU 107 detects at time t4 that the signal state of the interrupt port CPL_INT is changed to a high level, the CPU 107 is started up from the sleep state and measures the duty ratio of the pilot signal CPL based on the signal state of the duty measurement port CPL_DUTY (that is the output signal of the input buffer 105a) to acquire the rated current of the power supply facility. Then, the CPU 107 outputs the first control signal CT1 of a high level at time t5 in FIG. 3 to switch the first switching element 104b to ON state and changes the voltage of the pilot signal CPL from V2 to V3 (6 V), whereby the CCID 27 of the charging cable 2 is informed of the completion of the preparation for charging.

When the pilot circuit 27c of the CCID 27 detects that the voltage of the pilot signal CPL (the voltage of the pilot line 24) is changed from V2 to V3, the pilot circuit 27c determines that the preparation for charging of the plug-in vehicle 3 is completed, and turns on the relays 27a and 27b for supplying the AC power of the external power supply 1 to the plug-in vehicle 3 (that is, starts the supply of power). Accordingly, the AC power is supplied from the external power supply 1 to the battery charger 32 of the plug-in vehicle 3 via the charging cable 2 (the power supply lines 21 and 22).

The CPU 107 of the charging-control ECU 33 appropriately controls the charging of the driving battery by controlling the battery charger 32 based on the rated current of the power supply facility acquired from the duty ratio of the pilot signal CPL.

In this way, in the charging-control ECU 33, the input circuit 105 plays an important role in acquiring the rated current of the power supply facility by starting up the CPU 107. When the input circuit 105 is out of order, the CPU 107 may not be started up or the rated current of the power supply facility may not be acquired, whereby an appropriate charging control cannot be performed.

Therefore, it is important to perform a malfunction diagnosis for the input circuit 105. In this embodiment, the CPU 107 of the charging-control ECU 33 performs the malfunction diagnosis process for the input circuit 105 in accordance with the following sequence. Two examples of the malfunction diagnosis process will be described below, and any malfunction diagnosis process may be employed. The CPU 107 performs the following malfunction diagnosis process when the charging cable 2 is not connected to the plug-in vehicle 3 (for example, when the plug-in vehicle 3 is traveling). This is because the above-mentioned charging operation is interrupted when the malfunction diagnosis process is performed in a state where the charging cable 2 is connected to the plug-in vehicle 3.

Figure 4A:
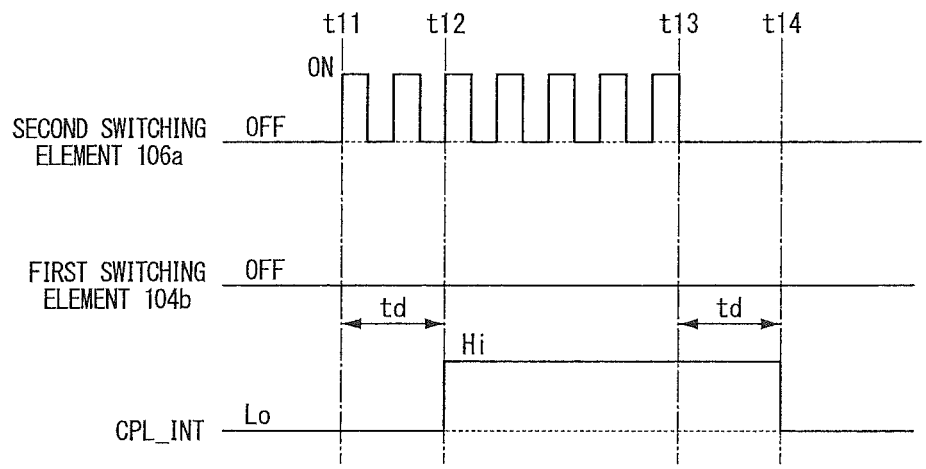
FIG. 4A is a timing diagram illustrating a first example of a malfunction diagnosis process for an input circuit 105 performed by a CPU 107.

A first example of the malfunction diagnosis process performed by the CPU 107 will be described below with reference to the timing diagram of FIG. 4A.

First, the CPU 107 controls the first switching element 104b and the second switching element 106a into OFF state by setting the first control signal CT1 to a low level and setting the second control signal CT2 to a high level as an initial process. At this time, since the signal state of the interrupt port CPL_INT of the CPU 107 is at a low level.

Subsequently, the CPU 107 controls the second switching element 106a in a PWM manner by outputting the pulse-like second control signal CT2 with a fixed frequency (for example, 1 kHz with a duty ratio of, for example, 50%) in the period of times t11 to t13 in FIG. 4A. Accordingly, in the period of times t11 to t13, a pulse-like pseudo-pilot signal having the same frequency and duty ratio as the second control signal CT2 is supplied from the pseudo-signal supply circuit 106 to the pilot signal line L.

The timer IC 105b of the input circuit 105 sets the start-up factor interrupt signal to a high level at time t12 in a fixed time td after detecting a first edge of the pseudo-pilot signal at time t11, and sets the start-up factor interrupt signal to a low level at time t14 in a fixed time td after detecting a final edge of the pseudo-pilot signal at time t13. That is, the signal state of the interrupt port CPL_INT of the CPU 107 is at a high level only in the period of times t12 to t14.

The CPU 107 performs the malfunction diagnosis for the input circuit 105 based on the signal state of the interrupt port CPL_INT when controlling the pseudo-signal supply circuit 106 to supply the pulse-like pseudo-pilot signal to the pilot signal line L as described above. Specifically, the CPU 107 determines that the input circuit 105 is normal, when the signal state of the interrupt port CPL_INT is changed to a high level in a fixed time td after starting the supply of the pseudo-pilot signal and the signal state of the interrupt port CPL_INT is changed to a low level in a fixed time td after stopping the supply of the pseudo-pilot signal.

The CPU 107 determines that the input circuit 105 malfunctions, when the signal state of the interrupt port CPL_INT is not changed from a low level to a high level even in a fixed time td after starting the supply of the pseudo-pilot signal or when the signal state of the interrupt port CPL_INT is not changed from a high level to a low level even in a fixed time td after stopping the supply of the pseudo-pilot signal.

Figure 4B:
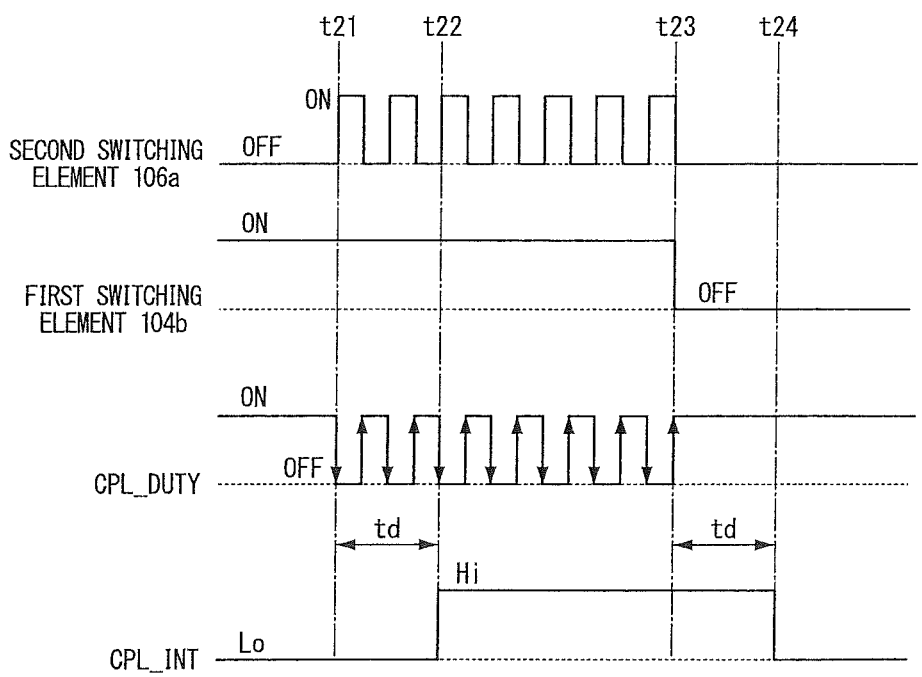
FIG. 4B is a timing diagram illustrating a second example of the malfunction diagnosis process for the input circuit 105 performed by the CPU 107.

A second example of the malfunction diagnosis process performed by the CPU 107 will be described below with reference to the timing diagram of FIG. 4B.

First, the CPU 107 controls the first switching element 104b into ON state and controls the second switching element 106a into OFF state, by setting the first control signal CT1 and the second control signal CT2 to a high level as an initial process. At this time, since the signal state of the interrupt port CPL_INT of the CPU 107 is at a low level.

Subsequently, the CPU 107 controls the second switching element 106a in a PWM manner by outputting the pulse-like second control signal CT2 with a fixed frequency (for example, 500 Hz with a duty ratio of, for example, 50%) in the period of times t21 to t23 in FIG. 4B. Accordingly, in the period of times t21 to t23, a pulse-like pseudo-pilot signal having the same frequency and duty ratio as the second control signal CT2 is supplied from the pseudo-signal supply circuit 106 to the pilot signal line L. The CPU 107 switches the first switching element 104b to OFF state at time t23.

The timer IC 105b of the input circuit 105 sets the start-up factor interrupt signal to a high level at time t22 in a fixed time td after detecting the first edge of the pseudo-pilot signal at time t21, and sets the start-up factor interrupt signal to a low level at time t24 in a fixed time td after detecting the final edge of the pseudo-pilot signal at time t23. That is, the signal state of the interrupt port CPL_INT of the CPU 107 is at a high level only in the period of times t22 to t24.

In the period of times t21 to t23, since a pulse signal having the same frequency and duty ratio as the pseudo-pilot signal is output from the input buffer 105a to the duty measurement port CPL_DUTY of the CPU 107, the signal state of the duty measurement port CPL_DUTY is changed to the same frequency and duty ratio as the pseudo-pilot signal.

The CPU 107 performs the malfunction diagnosis for the input circuit 105 based on the signal states of the interrupt port CPL_INT and the duty measurement port CPL_DUTY when controlling the pseudo-signal supply circuit 106 to supply the pulse-like pseudo-pilot signal to the pilot signal line L. Specifically, the CPU 107 determines that the input buffer 105a and the timer IC 105b in the input circuit 105 are normal, when it can be detected that an edge is generated in the signal state of the interrupt port CPL_INT in a fixed time td after starting the supply of the pseudo-pilot signal and in a fixed time td after stopping the supply of the pseudo-pilot signal.

The CPU 107 determines that the line extending from the input buffer 105a of the input circuit 105 to the duty measurement port CPL_DUTY is normal, when it can be detected that an edge is generated in the signal state of the duty measurement port CPL_DUTY after starting the supply of the pseudo-pilot signal.

On the other hand, the CPU 107 determines that the input buffer 105a and the timer IC 105b in the input circuit 105 malfunction, when it cannot be detected that an edge is generated in the signal state of the interrupt port CPL_INT or when edges are detected but the edge detection times are different.

The CPU 107 determines that the line extending from the input buffer 105a of the input circuit 105 to the duty measurement port CPL_DUTY malfunction (it is supposed that the input buffer 105a malfunctions or the line is disconnected), when it cannot be detected that an edge is generated in the signal state of the duty measurement port CPL_DUTY or when edges are detected but a large difference exists for the frequency and the duty ratio of the pseudo-pilot signal.

As described above, according to this embodiment, since the pseudo-signal supply circuit 106 supplying the pseudo-pilot signal is disposed in the pilot signal line L extending from the pilot signal input terminal 100 of the charging-control ECU 33 to the input circuit 105, it is possible to perform the malfunction diagnosis for the input circuit 105 based on the signal state of the input port of the CPU 107 when controlling the pseudo-signal supply circuit 106 to supply the pseudo-pilot signal to the pilot signal line L.

The invention is not limited to the above-mentioned embodiment, but may be modified as follows.

For example, the above-mentioned embodiment employs the configuration in which the voltage of the pilot signal CPL is automatically changed from V1 to V2 at the time point (at time t2 in FIG. 3) at which the charging cable 2 is connected to the plug-in vehicle 3. However, the invention is not limited to this configuration, and may employ a configuration in which the CPU 107 is started up at the time at which the charging cable 2 is connected to the plug-in vehicle 3, that is, when the pilot signal CPL of a voltage value V1 is input to the charging-control ECU 33, and the voltage of the pilot signal CPL is changed from V1 to V2 under the control of the CPU 107.

What is claimed is:

1. An electronic control unit that is mounted on a vehicle which is configured to be charged with an external power supply and that receives a pilot signal via a charging cable before being supplied with a power when the vehicle is connected to the external power supply via the charging cable, the electronic control unit comprising:
    a processor that performs a process necessary for a charging control based on the pilot signal;
    an input circuit that is disposed in a stage preceding an input port of the processor; and
    a pseudo-signal supply circuit that supplies a pseudo-pilot signal to a pilot signal line extending from a pilot signal input terminal of the electronic control unit to the input circuit under control of the processor,
    wherein the input port includes an interrupt port used to input a start-up factor interrupt signal serving as a start-up factor of the processor and a duty measurement port used to measure a duty ratio of the pilot signal,
    wherein the input circuit includes a circuit that generates the start-up factor interrupt signal and outputs the generated start-up factor interrupt signal to the interrupt port when a pulse- like pilot signal is input via the pilot signal line and that buffers the pilot signal and outputs the buffered pilot signal to the duty measurement port, and
    wherein the processor performs the malfunction diagnosis for the input circuit based on the signal states of the interrupt port and the duty measurement port when controlling the pseudo-signal supply circuit to supply a pulse-like pseudo-pilot signal to the pilot signal line.

2. The electronic control unit according to claim 1, wherein the processor performs the malfunction diagnosis for the input circuit when the charging cable is not connected to the vehicle.

* * * * *